(12) United States Patent
Irwan et al.

(10) Patent No.: US 11,005,812 B2
(45) Date of Patent: *May 11, 2021

(54) AUTONOMOUS DECENTRALIZATION OF CENTRALIZED STATEFUL SECURITY SERVICES WITH SYSTEMATIC TAMPER RESISTANCE

(71) Applicant: XAGE SECURITY, INC., Palo Alto, CA (US)

(72) Inventors: Susanto Junaidi Irwan, San Francisco, CA (US); Kamesh Raghavendra, Bangalore Karnataka (IN)

(73) Assignee: XAGE SECURITY, INC., Palo Alto, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/542,150

(22) Filed: Aug. 15, 2019

(65) Prior Publication Data

US 2019/0372931 A1    Dec. 5, 2019

Related U.S. Application Data

(63) Continuation of application No. 15/486,137, filed on Apr. 12, 2017, now Pat. No. 10,432,585.

(30) Foreign Application Priority Data

Feb. 25, 2017  (IN) .............................. 201711006700

(51) Int. Cl.
*H04L 29/06* (2006.01)
*H04L 9/32* (2006.01)
*H04L 9/06* (2006.01)

(52) U.S. Cl.
CPC ........ *H04L 63/0218* (2013.01); *H04L 9/3236* (2013.01); *H04L 9/3239* (2013.01);
(Continued)

(58) Field of Classification Search
CPC ............ H04L 63/0421; H04L 63/0218; H04L 9/3239; H04L 63/08; H04L 9/0643; G06F 21/6263; G06Q 30/0269; H04W 12/02
(Continued)

(56) References Cited

U.S. PATENT DOCUMENTS

2010/0211781 A1    8/2010 Auradkar et al.
2015/0244690 A1*   8/2015 Mossbarger ............ H04L 9/006
                                                         713/171
(Continued)

FOREIGN PATENT DOCUMENTS

WO    WO 2017/066002 A1    4/2017

OTHER PUBLICATIONS

Irwan, U.S. Appl. No. 15/486,137, filed Apr. 12, 2017, Advisory Action, dated Apr. 19, 2019.
(Continued)

*Primary Examiner* — Evans Desrosiers
(74) *Attorney, Agent, or Firm* — Hickman Becker Bingham Ledesma LLP

(57) ABSTRACT

In an embodiment, a computer implemented method comprises accessing, from a first data repository, identity information associated with one or more protected computing devices; creating mapped identity information by encrypting and mapping the identity information according to a different identity data format that is compatible with the one or more protected computing devices; updating stored blockchain data using the mapped identity information; storing the mapped identity information from the blockchain data in a second data repository; generating decrypted identity information from the mapped identity information stored in the second data repository; and performing one or more authentication services for a client device on behalf of the one or more protected computing devices by using the mapped identity information in the second data repository; wherein the method is performed by one or more computing devices.

20 Claims, 6 Drawing Sheets

(52) U.S. Cl.
CPC ............ *H04L 9/3297* (2013.01); *H04L 63/08* (2013.01); *H04L 9/0643* (2013.01); *H04L 63/0421* (2013.01); *H04L 63/083* (2013.01); *H04L 2209/38* (2013.01)

(58) Field of Classification Search
USPC .......................................................... 726/26
See application file for complete search history.

(56) References Cited

U.S. PATENT DOCUMENTS

2016/0267605 A1    9/2016  Lingham et al.
2017/0132615 A1*  5/2017  Castinado ............ G06F 16/2255

OTHER PUBLICATIONS

Irwan, U.S. Appl. No. 15/486,137, filed Apr. 12, 2017, Office Action, dated Oct. 17, 2018.
Irwan, U.S. Appl. No. 15/486,137, filed Apr. 12, 2017, Notice of Allowance, dated Jun. 12, 2019.
Irwan, U.S. Appl. No. 15/486,137, filed Apr. 12, 2017, Final Office Action, dated Feb. 26, 2019.
The International Bureau of WIPO, "International Preliminary Report on Patentability", in application No. PCT/US2018/018033, dated Aug. 27, 2019, 8 pages.
International Searching Authority, "Search Report" in application No. PCT/US18/18033, dated Apr. 27, 2018, 14 pages.
Current Claims in application No. PCT/US 18/18033, dated Apr. 2018, 5 pages.

* cited by examiner

AUTONOMOUS DECENTRALIZATION OF CENTRALIZED STATEFUL SECURITY SERVICES WITH SYSTEMATIC TAMPER RESISTANCE

BENEFIT CLAIM

This application claims the benefit under 35 U.S.C. § 120 as a Continuation of application Ser. No. 15/486,137, filed Apr. 12, 2017, which claims the benefit under 35 U.S.C. § 119 of India application 201711006700, filed Feb. 25, 2017, the entire contents of which are hereby incorporated by reference for all purposes as if fully set forth herein.

TECHNICAL FIELD

The technical field of the present disclosure relates to improved methods, systems, computer software, and/or computer hardware in the field of data security. The disclosure relates more specifically to improved computer-implement methods and systems for providing local validation and access control services without uninterrupted access to the internet and with increased data security resistance to malicious attacks. Certain embodiments are useful in collecting and processing data from internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally, client computing devices with internet access can connect to enterprise server computers, which provide identity and access management (IAM) services for managing, validating, and controlling user access. Almost without exception, networks that permit access from desktop computers or mobile computing devices of end users have placed all principal security apparatus at the server computer. For example, a user who wants access to an online account can use a computer with internet connectivity to access a website with a login page and input identity information, such as a username and password. Once a server computer validates the identity information, policies control the amount of access any particular device has so that the user can access their own online account without accessing any other data.

This traditional approach requires a client device to have uninterrupted access to the internet for validation to occur. Furthermore, a security breach of the enterprise server could compromise the identity information of all the users.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Thus, there is a need for applications, devices, and users to authenticate and collaborate locally without relying on uninterrupted internet access. There is also a need for a secure method of storing and accessing identity information that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
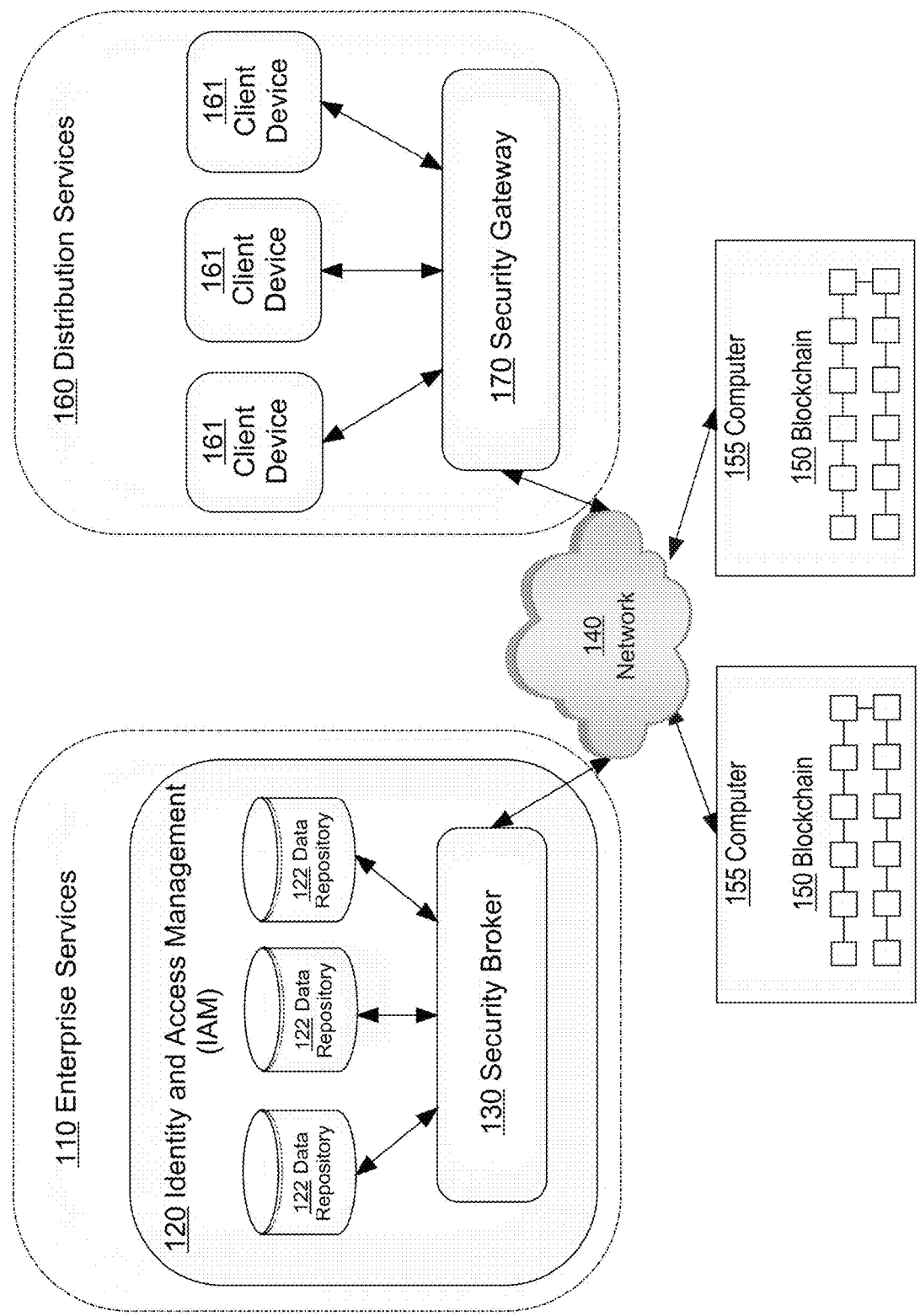
FIG. 1 illustrates a networked computer system in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 General Overview
  2.0 Structural Overview
    2.1 Enterprise Services
    2.2 Blockchain Architecture
    2.3 Distribution Services
  3.0 Functional Overview
    3.1 Security Broker
    3.2 Blockchain Operations
    3.3 Security Gateway
  4.0 Hardware Overview
  1.0 General Overview According to various embodiments, methods and systems are provided that enable improved computer and network efficiency by providing local identity and access management (IAM) services without a need for uninterrupted connection to a centralized network such as the internet. Past approaches required direct internet connectivity between client devices and enterprise servers for enterprise servers to perform IAM services. However, the present approach decentralizes IAM information, localizes IAM services, and utilizes a consensus network for data security, which has the benefit of decreasing network traffic and excessive use of processing resources for enterprise servers while increasing resistance against malicious attacks on sensitive data. Moreover, IAM services can be effectively extended from an enterprise computing environment to a plurality of internet of things (IoT) devices that are geographically distributed and separate from the enterprise environment, without implementing resource-intensive security software on or at each IoT device.

In an embodiment, a networked computer system comprises a security broker for enterprise services, a security gateway for distribution services, and a blockchain system to store and transfer identity information between the security broker and the security gateway. The security broker may be software, hardware, or a combination thereof that detects changes to the identity information and updates blockchain data with the new identity information. The security gateway may be software, hardware, or a combination thereof that detects changes to the blockchain data and updates a local data repository with the new identity information. The security gateway also provides local, virtual IAM services using the new identity information stored in the local data repository. The blockchain system is a distributed database storing linked blocks of data in multiple computing devices.

In an embodiment, a computer implemented method comprises, using a first server, detecting one or more changes to identity information that is stored in a first data repository; using the first server, in response to detecting the one or more changes to the identity information, mapping the identity information according to a different identity data format that is compatible with one or more protected computing devices, to result in creating mapped identity information; using the first server, updating stored blockchain data using the mapped identity information; using a second server, detecting mapped identity information updates to the blockchain data; using the second server, in response to detecting the mapped identity information updates, transferring the mapped identity information updates to a second data repository; and using the second server, performing one or more authentication services on behalf of the one or more protected computing devices, using the mapped identity information updates in the second data repository.

In an embodiment, one or more non-transitory computer-readable storage media storing one or more sequences of program instructions which, when executed by one or more computing devices, cause: using a first server, detecting changes to authentication information that is stored in a first data repository; using the first server, in response to detecting changes to the authentication information, mapping the identity information according to a different authentication data format that is compatible with one or more protected computing devices, to result in creating mapped authentication information; using the first server, updating stored blockchain data using the mapped authentication information; using a second server, detecting mapped authentication information updates to the blockchain data; using the second server, in response to detecting the mapped authentication information updates, transferring the mapped authentication information updates to a second data repository; and using the second server, performing one or more authentication services on behalf of the one or more protected computing devices, using the mapped authentication information updates in the second data repository.

In an embodiment, a computer system comprises a distributed blockchain data repository; a first server computer that is communicatively coupled to the distributed blockchain data repository and comprising a non-transitory data storage medium storing instructions which, when executed by the first server computer, cause detecting changes to identity information stored in a first data repository; mapping the identity information and store mapped identity information in a cache; updating the distributed blockchain data repository with the mapped identity information stored in the cache; a second server computer that is communicatively coupled to the distributed blockchain data repository and comprising a non-transitory data storage medium storing instructions which, when executed by the first server computer, cause detecting mapped identity information updates to the distributed blockchain data repository; transferring the mapped identity information updates to a second data repository; and performing authentication services using the mapped identity information updates in the second data repository.

In an embodiment, a computer system comprises a distributed blockchain data repository and a first server computer that is communicatively coupled to the distributed blockchain data repository and comprising a non-transitory data storage medium storing instructions which, when executed by the first server computer, cause performing: detecting changes to identity information stored in a first data repository; mapping the identity information to create mapped identity information; updating the distributed blockchain data repository with the mapped identity information. The system also comprises a second server computer that is communicatively coupled to the distributed blockchain data repository and comprising a non-transitory data storage medium storing instructions which, when executed by the first server computer, cause performing: detecting mapped identity information updates to the distributed blockchain data repository; transferring the mapped identity information updates to a second data repository; and performing authentication services using the mapped identity information updates in the second data repository.

2.0 Structural Overview

FIG. 1 illustrates a networked computer system in an example embodiment. In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices providing enterprise services 110, devices providing distribution services 160, and devices of a blockchain 150. Therefore, each of elements 110, 150, 160 of FIG. 1 may represent one or more computers that host or execute stored programs that provide the functions and operations that are described further herein in connection with enterprise services, distribution services and blockchain operations. The methods and systems describe herein may be designed to accommodate a variety of different enterprises. Each enterprise may have its own security broker 130, blockchain 150, and/or security gateway 170 with settings that are customized to the preferences of each enterprise.

2.1 Enterprise Services

Enterprise services 110 may be services that are programmatically offered by an enterprise, including identity and access management (IAM) 120 services. Typically, such services are delivered by executing control programs or application programs on computers and processing and responding to requests of client computing devices using client-server digital message communications over networks based on defined protocols. IAM 120 services may enable devices, such as enterprise servers, to manage, validate, and control device and user access for any of a plurality of geographically distributed computing devices, including but not limited to IoT devices.

Enterprise servers and other enterprise computing devices are often heavily protected to ensure data security and prevent malware breaches. Traditionally, when a device requests access from an enterprise server, the enterprise server may go through a validation process that is managed using programs executed in cooperation by the enterprise server and device. The validation process may include authentication, authorization, and accounting of users, applications, and/or devices. Access control policies defined by the enterprise server may determine which users, applications, and/or devices will have access to what types of data. Instead of this traditional approach, one embodiment of the current approach implements a validation process not at the enterprise server but using a security gateway 170, as further described herein, with significant technical benefits and improvements over past practice.

In an embodiment, the access control policies may be stored in a data repository 122 associated with the enterprise server and updated according to enterprise needs. Consequently, a central control point associated with an enterprise can maintain control of security policy, while IAM 120 services or other functions are executed closer to protected IoT devices, for example. Identity information associated with users, applications, and/or devices may also be stored in data repository 122. Identity information may include, for example, usernames, passwords, and their corresponding access control policies.

Security broker 130 may be a computer, software and/or hardware or a combination storing instructions that are programmed or configured to access identity information stored in the data repository 122 and detect changes to the identity information. The security broker 130 may copy the identity information locally in a cache, hash and encrypt the identity information, and send the information over a network 140 to a blockchain 150, as further described herein.

Network 140 broadly represents a combination of one or more local area networks, wide area networks, global interconnected internetworks, such as the public internet, or a combination thereof. Each such network may use or execute stored programs that implement internetworking protocols according to standards such as the Open Systems Interconnect (OSI) multi-layer networking model, including but not limited to TCP or UDP, IP, HTTP, and so forth. All computers described herein may be configured to connect to the network 140 and the disclosure presumes that all elements of FIG. 1 are communicatively coupled via network 140.

While each of the components listed above is illustrated as if located on a single computer, one or more of the components listed above may be part of and/or executed on different computers. For example, data repository 122 may be located on the same or a separate computer from another data repository 122. As another example, data repository 122 may be storage drives coupled to an enterprise server.

2.2 Blockchain Architecture

The blockchain 150 may comprise blocks of linked data that are stored in an interconnected network of computers, with suitable stored programs at those computers to support ordered creation and transmission of blockchain data. Blockchain 150 forms a distributed database that maintains a continuously growing list of ordered records termed blocks that are timestamped and linked to a previous block. Each block in the series of blocks is linked together chronologically, with each new block containing a hash of the previous block. Each computer 155, or node, in a network of computers may store the entire record of linked data blocks. This creates a consensus network of computers that can verify the integrity of each block of data and the integrity of the entire blockchain 150. The consensus network has the benefit of having a high Byzantine fault tolerance, which is the ability of a computing system to tolerate Byzantine failures. As a result, the blockchain 150 functions as a distributed database that ensures the integrity of the data by utilizing hash functions to link each block to its previous block and storing the entire record of data blocks at each node.

2.3 Distribution Services

Distribution services 160 may be computer-implemented services that are configured or programmed for distributing IAM services locally to a client device 161. A client device 161 may be a computer, a virtual computer, and/or a computing device. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The client device 161 may also be other IoT devices, which are physical devices with network connectivity capabilities that enables these physical devices to collect and exchange data. The client device 161 may also be specific users using a computer or IoT device. The client device 161 may also be applications running on a computer or IoT device.

Security gateway 170 may be a computer, software and/or hardware or a combination storing instructions configured to perform virtual IAM services locally with or without uninterrupted internet access. The security gateway 170 may access identity information stored in the blockchain 150, detect changes to blockchain 150 data and update a local data repository with the updated access identity information, as further described herein. Client device 161 may connect to the security gateway 170 so that the security gateway 170 may perform virtual IAM services for client device 161 locally using the identity information stored in a data repository associated with the security gateway 170. Performing virtual IAM services for client device 161 may occur with or without access to the network 140. The security gateway 170 may also store client device information in a separate data repository and periodically update the blockchain 150 with the stored information. Further details are provided herein.

3.0 Functional Overview

The security broker 130, blockchain 150, and security gateway 170 provide a novel technology combination. In an embodiment, the security broker 130, blockchain 150, and security gateway 170 interoperate programmatically to provide a virtual security intermediary between the enterprise services 110 and the client device 161. In an embodiment, security gateway 170 is programmed to provide local, virtual IAM services without the need for client device 161 to connect to the internet and access enterprise servers that would otherwise perform these IAM 120 services. The security broker 130 and blockchain 150 are programmed or configured to copy, encrypt, store, and transport sensitive identity information in a secure manner so that the security gateway 170 may be updated with changes to the identity information, as further described in other sections herein.

3.1 Security Broker

Figure 2:
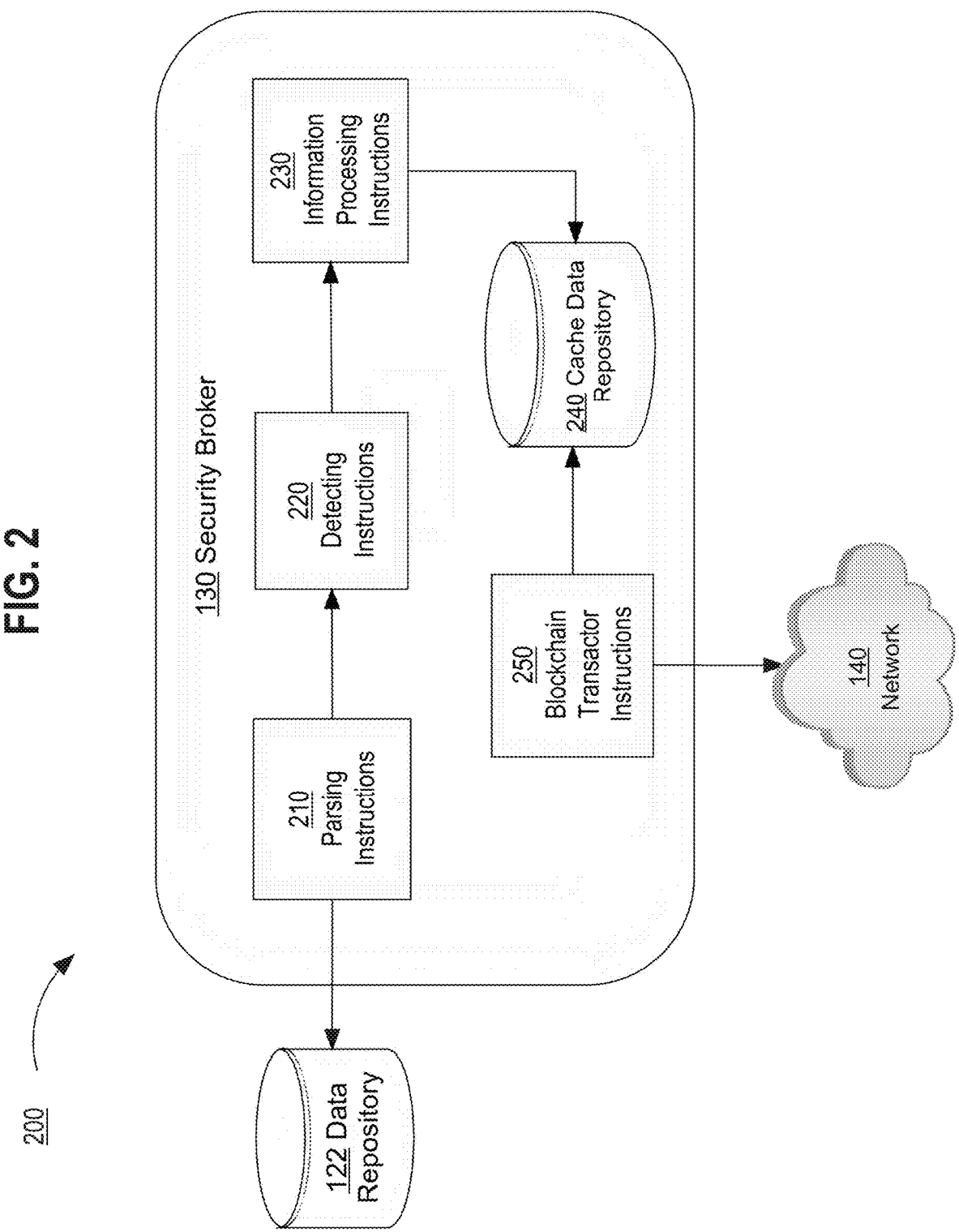
FIG. 2 illustrates a security broker in an example embodiment.

FIG. 2 illustrates a security broker in an example embodiment.

Security broker 130 may be a computer, software and/or hardware or a combination storing instructions and/or databases that act to protect, store, and transfer identity information associated with one or more enterprise servers. Specifically, security broker 130 may contain parsing instructions 210 which access the identity information stored in data repository 122 and parse the identity information to generate a reorganized list of identity information. The reorganized list may be a list of cleartext usernames and passwords or it may be hashes of the usernames and passwords that were generated by the enterprise servers. The list of cleartext usernames and passwords, or the hashes of the usernames and passwords, are generated for reorganizational purposes. For example, the identity information used by the enterprise servers for IAM 120 services may have a particular hierarchical structure. The information processing instructions 230 may create its own representation of the identity information to interpret the hierarchical structure. The frequency at which the security broker 130 accesses and parses the identity information may be determined by the enterprise. The frequency may be in seconds, minutes, hours, days, weeks, or any other increment of time.

The security broker 130 is programmed to detect changes to the identity information since the previous check. Specifically, the security broker 130 may contain detecting instructions 220 which compare the current hash with a hash from a previous detection. When identity information such as usernames and passwords is stored, a hash function may be applied to the identity information. For example, a hash function, such as an MD5, may map each username and password to a hash, or index, such as an MD5 hash. The hash may act as a numerical representation of each username and password. Any hash function, as understood in the art, may be used. Any changes to the identity information would change the hash, thereby creating differences in the current hash compared to the hash from a previous detection.

If the hash has not changed, then the security broker 130 is programmed to return to parsing. However, if the hash has changed, then the information processing instructions 230 may extract the identity information, specifically the usernames and passwords, from the data repository 122. To do so, the information processing instructions 230 may copy the identity information into a cache data repository 240 where changes can be made. The information processing instructions 230 may then apply a hash function associated with the security broker 130 to the cleartext usernames and passwords or the hash of the usernames and passwords, and map the cleartext usernames and passwords or the hash of the usernames and passwords to a hash, or index, in a hash table. The hash function may be, for example, BCRYPT, or any other applicable hash function. The nature of the hash function may prohibit any reversal of the hashed value back to the original cleartext, which provides an added layer of security for the identity information.

The information processing instructions 230 also may be programmed to extract any remaining identity information, such as a group ID, and generate a Username-Password Key (UPK). Optionally, where a two-factor authentication approach is used, a Personal Identification Number (PIN) associated with a user may also be extracted from the data repository 122 and used as a salt to generate the UPK. In this context, a salt is a random variable that provides additional input to safeguard information. The usernames, passwords, and remaining identity information may then be collectively encrypted using a symmetric algorithm, such as the Advanced Encryption Standard (AES), with the UPK acting as a key for subsequent decryption. The information processing instructions 230 may further encrypt the already encrypted identity information by generating a private key associated with the security broker 130. A symmetric algorithm, such as AES, may be used to encrypt the encrypted identity information, with the private key acting as a key for subsequent decryption. This creates a nested two-layer encryption for added security, although any number of additional layers, using any number of different types of keys, may be implemented. The encrypted identity information may then be stored in the hash table in association with the index. In other words, the hash table may contain an index that was generated using the username and password alone. The encrypted data generated using the collective identity information may be mapped to the index such that the index may be used to reference the encrypted data.

Blockchain transactor instructions 250 associated with the security broker 130 may periodically check the cache data repository 240 for changes. The blockchain transactor instructions 250 may identify the newly hashed and encrypted identity information stored in the cache data repository 240 and update blockchain 150 by creating new data entries of the hashed and encrypted identity information in the blockchain 150. The hashed and encrypted identity information is sent to the blockchain 150 through the network 140.

Figure 4:
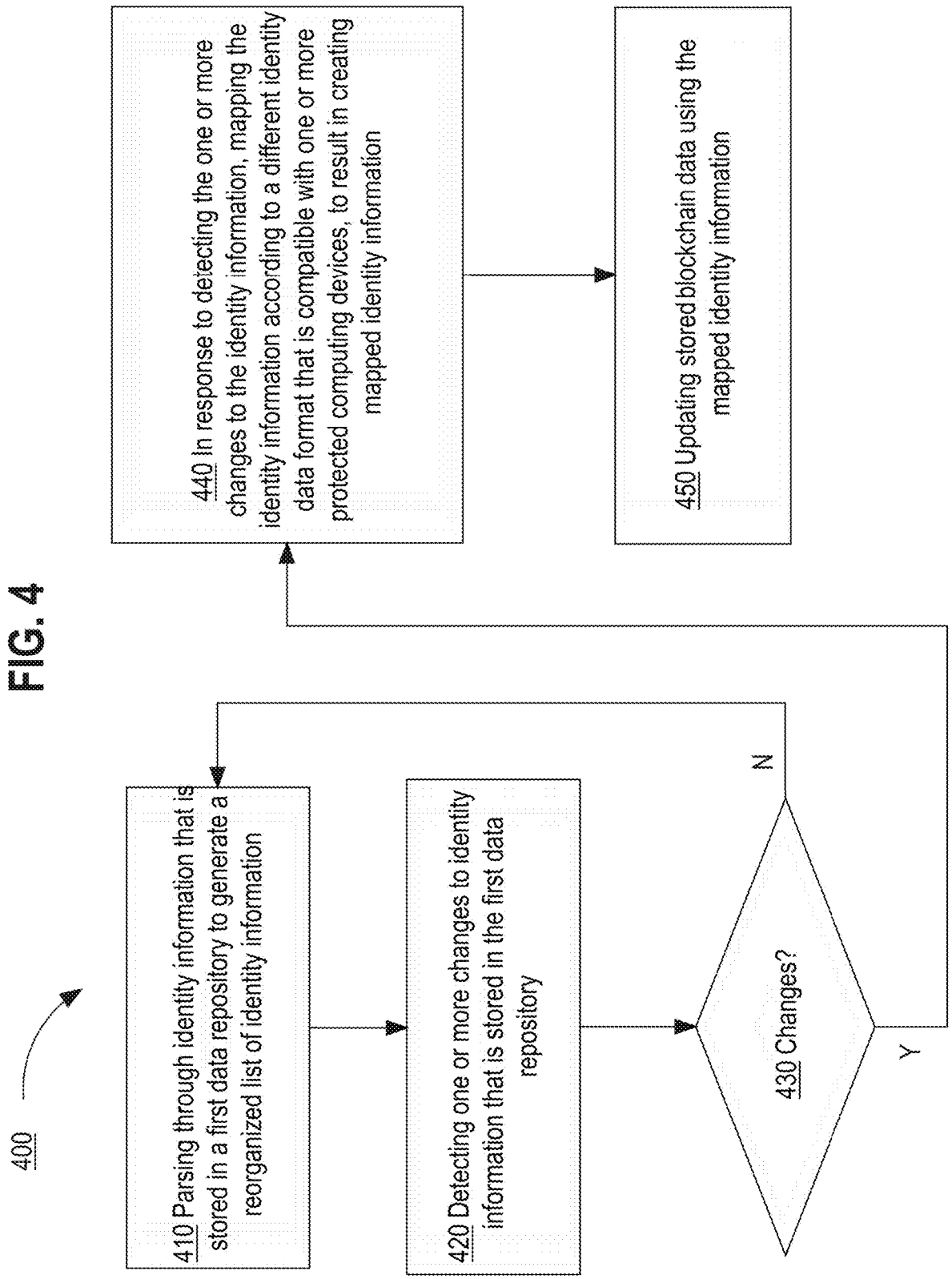
FIG. 4 illustrates a method for distributing identity information in an example embodiment.

FIG. 4 illustrates a method of distributing identity information in an example embodiment.

In an embodiment, a programmed algorithm or method 400 starts at step 410, in which a first server may parse the identity information stored in a first data repository to generate a reorganized list of identity information. The first server may be, for example, an enterprise server running the security broker 130. The reorganized list of identity information may be usernames and passwords in cleartext or hashes of the usernames and passwords that were generated by the enterprise server. The security broker 130 contains parsing instructions 210 which may periodically parse the identity information stored in the data repository 122 to generate a list of cleartext usernames and passwords, or the hashes of the usernames and passwords, for reorganizational purposes.

At step 420, the first server may be used to detect if one or more changes have been made to the identity information that is stored in the first data repository. This detection may be done by comparing the current MD5 hash with the MD5 hash from the previous detection using the detecting instructions 220. When identity information such as usernames and passwords are stored, a hash function may be applied to the identity information. For example, a hash function, such as an MD5, may map each username and password to a hash, or index, such as an MD5 hash. The hash may act as a numerical representation of each username and password. Any hash function, as understood in the art, may be used. Any changes to the identity information would change the hash, thereby creating differences in the current hash compared to the hash from a previous detection. If the current hash matches the previous hash, then no changes have been made. However, if the current hash does not match the previous hash, then changes to the username and passwords have been made.

Step 430 is a graphical illustration of determining whether such a change has occurred. If there have been no changes to the identity information, then the first server may proceed to step 410. If there have been one or more changes to the identity information, then the first server may proceed to step 440.

At step 440, in response to detecting the one or more changes to the identity information that occurred in step 430, the first server may map the identity information according to a different identity data format that is compatible with one or more protected computing devices, to create mapped identity information. For example, the information processing instructions 230 may copy the username and passwords into a cache data repository 240 where changes can be made. The information processing instructions 230 may then apply a hash function associated with the security broker 130 to the cleartext usernames and passwords and map the cleartext usernames and passwords to a hash, or index, in a hash table. The hash function may be, for example, BCRYPT, or any other applicable hash function. The nature of the hash function may prohibit any reversal of the hashed value back to the original cleartext, which provides an added layer of security for the identity information.

The information processing instructions 230 may also perform a series of processing steps to the identity information, including: extracting the usernames, passwords, and any remaining identity information from the database 122; generating a UPK, optionally using a PIN as a salt, and encrypting the collective identity information with an inner layer of encryption using a symmetric algorithm such as AES; and generating a private key and encrypting the already encrypted identity information with an outer layer of encryption using a symmetric algorithm such as AES. The encrypted identity information may then be mapped to the associated index in the hash table such that the index may be used to reference the encrypted data. The encryption may be compatible with, for example, the one or more protected enterprise servers.

At step 450 the first server may update stored blockchain data using the mapped identity information that is stored in the second data repository. Specifically, the blockchain transactor instructions 250 may periodically check the cache data repository 240 for changes. The blockchain transactor 250 then generates new entries in the blockchain 150.

3.2 Blockchain Operations

In other applications, a blockchain functions as a decentralized digital ledger that tracks numerous entries. Copies of the entire blockchain may be stored at each computer 155, or node, in a distributed network of interconnected computers of which FIG. 1 illustrates computer 155 with blockchain 150.

In an embodiment, proposed entries to the blockchain 150 may be checked by a majority of the computers for verification. For example, if the blockchain transactor instructions 250 of the security broker 130 detect changes in the cache data repository 240 and attempts to generate a new entry in the blockchain 150, the network of interconnected computers that also store copies of the blockchain would first run algorithms to evaluate the hashes and verify the validity of the entry. If a majority of the computers agree that the entry is valid, then the entry will be added as a new block in the blockchain 150. As a part of a consensus network, blockchain 150 enforces high Byzantine fault tolerance; for example, a malicious attack attempting to alter the information in the blockchain 150 would need to control over 50% of the computers in the consensus network to alter the consensus. Since it would be exceedingly difficult to maliciously attack and maintain control over that many computers, the blockchain data is better protected against malicious attacks than traditional methods of data storage.

3.3 Security Gateway

Figure 3:
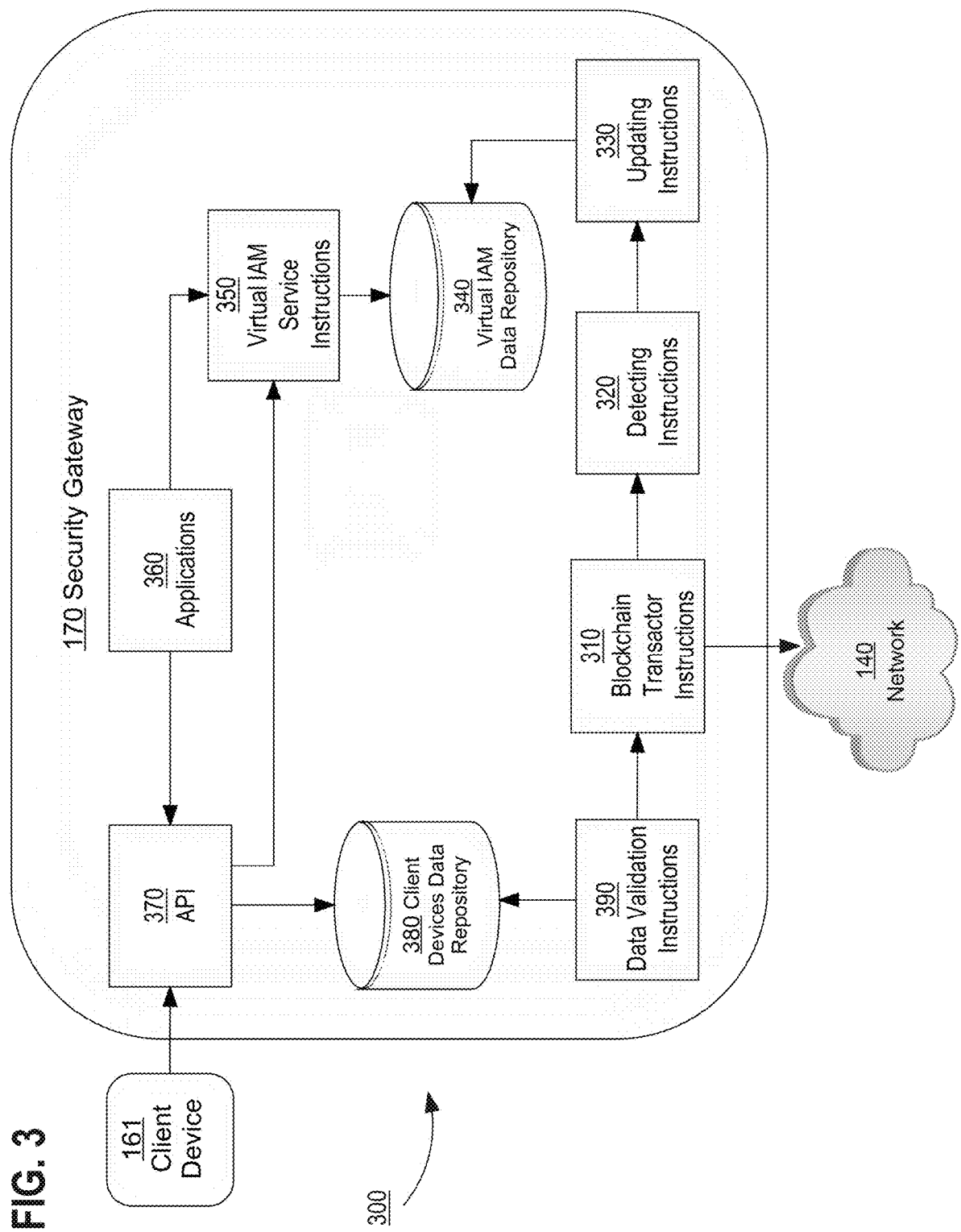
FIG. 3 illustrates a security gateway in an example embodiment.

FIG. 3 illustrates a security gateway in an example embodiment. Security gateway 170 may be a computer, software and/or hardware or a combination storing instructions and/or databases that detect, store, and utilize identity information for local authentication services with or without internet access. Specifically, the security gateway 170 may connect to the blockchain 150 through the network 140. Using blockchain transactor instructions 310, the security gateway 170 may periodically check for updates to the blockchain data. The blockchain transactor instructions 310 may be configured to check the blockchain 150 only when internet connectivity is available, at scheduled times, and/or in predetermined time intervals. The frequency of the checks may be determined by the enterprise and may be in seconds, minutes, hours, days, weeks, or any other increment of time. When internet connectivity is uninterrupted, the blockchain transactor instructions 310 may track when the latest update to the blockchain 150 occurred.

The security gateway may also contain detecting instructions 320 which detect any updates to the blockchain data by comparing the current hash with a hash from a previous detection. The current hash and the hash from a previous detection may be, for example, an MD5 hash generated using an MD5 algorithm as understood by one ordinarily skilled in the art. If any updates are detected, updating instructions 330 may transfer and store the updates to a virtual IAM data repository 340.

The security gateway 170 may comprise programmed instructions that implement an Application Program Interface (API) 370 that defines program functions that a client device 161 may call to connect to the security gateway 170. The API 370 may be, for example, a representational state transfer (REST) API integrated with an HTTP server so that RESTful API calls can be issued in parameterized URLs over HTTP from the client device 161 to the API 370. In one embodiment, a client device 161 connected to the gateway through the API 370 may be validated using the virtual IAM service instructions 350. The virtual IAM service instructions 350 may perform virtual IAM services for connected client device 161 locally using the identity information stored in the virtual IAM data repository 340.

Performing virtual IAM services for client device 161 may occur with or without access to the network 140. For example, while the security gateway 170 is offline, the virtual IAM service instructions 350 may, despite the lack of internet access, parse the virtual IAM data repository 340 for identity information and use the identity information to authenticate client device 161. A technical benefit of this approach is that validation services may occur without the constant need for internet connectivity. Instead, validation services may be provided locally through an intranet or other local networking facility.

The security gateway 170 may also require applications 360 that run inside the security gateway 170 be authenticated before the applications 360 can access any data stored in the virtual IAM data repository 340. The authentication can occur directly through the virtual IAM service instructions 350 or through the API 370. To authenticate, the virtual IAM service instructions 350 may receive identity information input in cleartext from a client device 161 outside the security gateway 170 or from applications 360 inside the security gateway 170. The cleartext input may be unencrypted identity information, such as a username and password. If the identity information stored in the data repository 122 had previously been hashed by the enterprise server, then the cleartext usernames and passwords may be first hashed with the same algorithm used by the enterprise server prior to applying the same hash function used by the security broker 130. Subsequently, the virtual IAM service instructions 350 may apply the same hash function used by the security broker 130 on the identity information to map the identity information to a hash, or index. The same hash function used by the security broker 130 should be used by the security gateway 170 to ensure the newly generated hash matches the index of the hash table stored in the virtual IAM data repository 340. The hash function may be, for example, BCRYPT, or any other applicable hash function.

The virtual IAM service instructions 350 may then query the hash table stored in the virtual IAM data repository 340 to find the matching index. If a matching index is found, the virtual IAM service instruction 350 may process and decrypt the value associated with the index in reverse order of the encryption. In this example, since the information processing instructions 230 of the security broker 130 created a nested encryption, with the identity information encrypted with a private key associated with the security broker 130 last, the security gateway 170 may use the virtual IAM service instructions 350 to decrypt the identity information using the private key associated with the security gateway 170 first. The private key associated with the security gateway 170 should be the same private key associated with the security broker 130, otherwise the identity information will not be properly decrypted. Once the private key is used to decrypt the outer encryption layer, a UPK may be used to decrypt the inner encryption layer. To generate the correct UPK, the virtual IAM service instruction 350 may use the cleartext usernames and passwords provided by the client device 161 or the applications 360. Optionally, a PIN may be added as a salt to generate the correct UPK. If a PIN is used, the PIN should be the same as the PIN used by the security broker 130. The UPK may then be used to decrypt the identity information. All the decryption steps above occur in memory and not at rest. If access policies were changed at an enterprise server while the security gateway 170 was offline, and activities that violate those access policy changes occurred while the security gateway was offline, the security gateway 170 may record, flag, and report those activities retroactively once internet connectivity is reestablished and the new access policies are accessible. For example, assume that the virtual IAM service instructions 350 performed validation services for a particular client device 161 while the security gateway 170 was offline, but the access policy was changed while the security gateway 170 was offline to deny the particular client device 161 access to certain data. In this scenario, granting access to the particular client device 161 that should have been denied access may be flagged or logged and reported or alerted once the security gateway 170 has internet connection.

The security gateway 170 may also store client device information in a client devices data repository 380 and periodically update the blockchain 150 with the information stored in the client devices data repository 380 for verification purposes. This is done with data validation instructions 390 which periodically calculate the hash of the information stored in the client devices data repository 380. The blockchain transactor instructions 310 may then record the hash into the blockchain 150.

Figure 5:
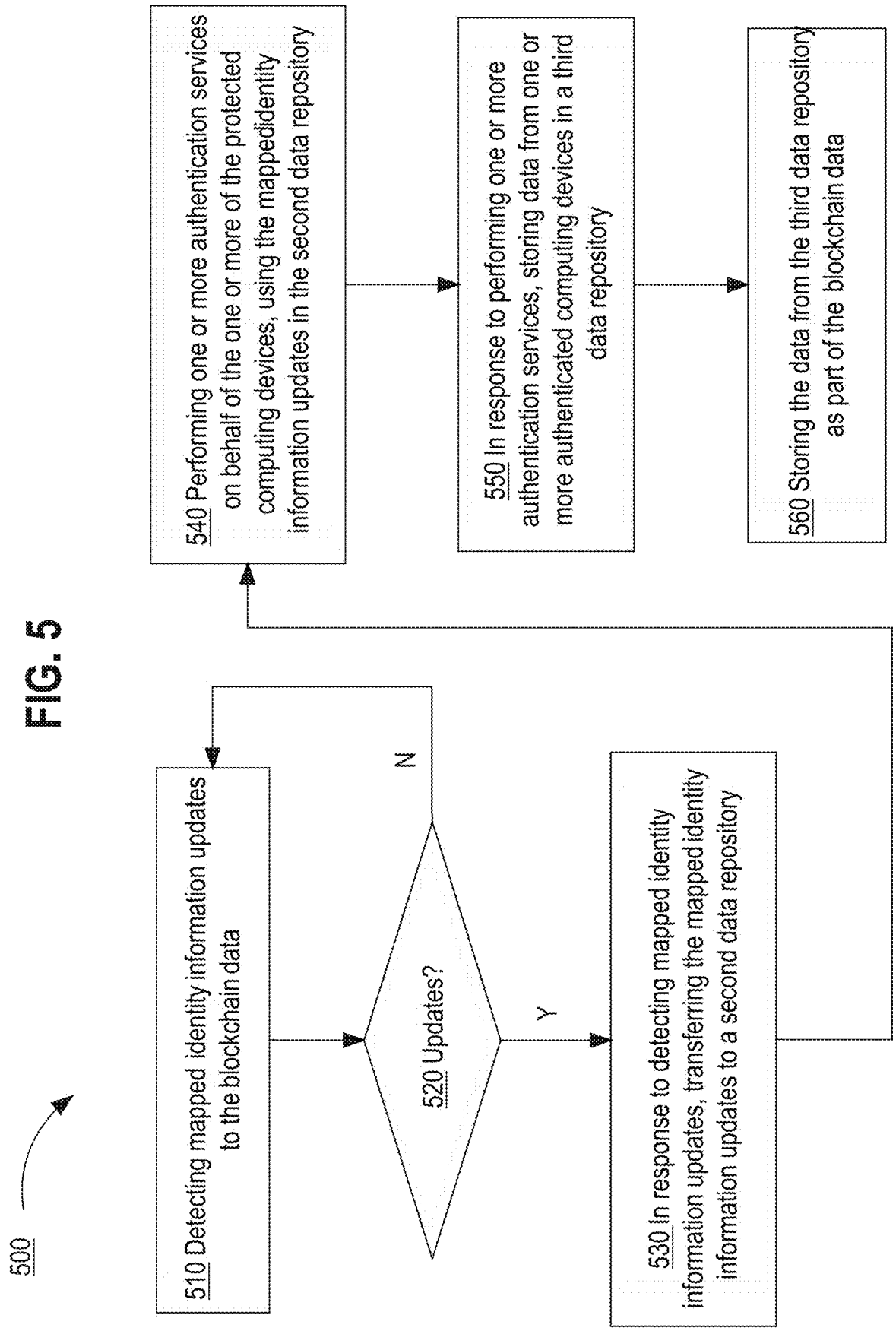
FIG. 5 illustrates a method for providing local verification services in an example embodiment.

FIG. 5 illustrates a method for providing local verification services in an example embodiment. The method 500 may start at step 510, at which a second server may detect mapped identity information updates to the blockchain data. The second server may be, for example, a local server running the security gateway 170. Using blockchain transactor instructions 310, the security gateway 170 may check for updates to the blockchain data based on internet connectivity, scheduled times, and/or predetermined time intervals. The frequency of the checks may be determined by the enterprise and may be in seconds, minutes, hours, days, weeks, or any other increment of time. When internet connectivity is uninterrupted, the blockchain transactor instructions 310 may track when the latest update to the blockchain 150 occurred.

Detecting instructions 320 may detect updates to blockchain data by comparing the current hash with a hash from a previous detection. The current hash and the hash from a previous detection may be, for example, an MD5 hash generated using an MD5 algorithm. If any updates are detected, updating instructions 330 may transfer the updated mapped identity information to a virtual IAM data repository 340. If the current hash matches the previous hash, then no updates have occurred. However, if the current hash does not match the previous hash, then updates have occurred. Step 520 is a graphical illustration of determining whether such an update has occurred. If there have been no updates to the blockchain data, then the second server may proceed to step 510. If there have been updates to the blockchain data, then the second server may proceed to step 530.

At step 530, in response to detecting mapped identity information updates, the second server may transfer the mapped identity information updates to a third data repository. For example, the second server running the security gateway 170 may use updating instructions 330 to transfer the username and passwords to a virtual IAM data repository 340 where the identity information may be stored locally for the purposes of providing virtual IAM services.

At step 540, the second server may perform one or more authentication services on behalf of one or more of the protected computing devices in step 440 above, using the mapped identity information updates in the third data repository. Specifically, the virtual IAM service instructions 350 may perform authentication services on behalf of the enterprise servers that would otherwise be performing IAM 120 services.

To authenticate, the virtual IAM service instructions 350 may receive identity information input in cleartext from a client device 161 outside the security gateway 170 or from applications 360 inside the security gateway 170. The cleartext input may be unencrypted identity information, such as a username and password. If the identity information stored in the data repository 122 had previously been hashed by the enterprise server, then the cleartext usernames and passwords may be first hashed with the same algorithm used by the enterprise server prior to applying the same hash function used by the security broker 130. Subsequently, the virtual IAM service instructions 350 may apply the same hash function used by the security broker 130 on the identity information to map the identity information to a hash, or index. The same hash function used by the security broker 130 should be used by the security gateway 170 to ensure the newly generated hash matches the index of the hash table stored in the virtual IAM data repository 340. The hash function may be, for example, BCRYPT, or any other applicable hash function.

The virtual IAM service instructions 350 may then query the hash table stored in the virtual IAM data repository 340 to find the matching index. If a matching index is found, the virtual IAM service instruction 350 may perform a series of steps, including: decrypting the identity information using the same private key associated with the security broker 130; generating the correct UPK using the cleartext usernames and passwords, and optionally, a PIN provided by the client device 161 or the applications 360; and decrypting the identity information with the generated UPK. All the decryption steps above occur in memory and not at rest.

At step 550, the second server, in response to performing one or more authentication services, may store data from one or more authenticated computing devices in a fourth data repository. Once a user, a client device 161, and/or one or more applications 360 have been authenticated, the identity information associated with the user, client device 161 and/or one or more applications 360 may be stored in a client devices data repository 380 and used to track future activities. A hash function may be applied to the identity information stored in the client devices data repository 380. At step 560 the second server may store the data from the fourth data repository as part of the blockchain data. Specifically, data validation instructions 390 may be used to calculate the hash of the information stored in the client devices data repository 380 and, if verified, transfer the information stored in the client devices data repository 380 to the blockchain 150.

Using the foregoing techniques, programmed computers may automatically detect, transfer, store, and utilize data in a manner that maximizes data security and data integrity while improving data delivery to client computers. Implementations provide for decreased use of network bandwidth and decreased use of processing resources for enterprise servers that no longer provide direct IAM 120 services to numerous users, applications, and/or devices. In other words, by decentralizing the IAM 120 services, network traffic is no longer concentrated at the enterprise server, which results in less network traffic and use of server processing resources.

Furthermore, the approaches disclosed herein improve data security and data integrity. The use of a blockchain 150 ensures that all changes to identity information are first approved by the consensus network, which protects the integrity of the blockchain data. The nature of the blockchain 150 also ensures that each new block of data is linked to the previous block, creating an improved method of documenting changes and rejecting unapproved changes. Consequently, the blockchain 150 functions as a secure backup for sensitive identity information with high Byzantine fault tolerance.

Improved data security is also provided by the techniques described herein through the various encryption methods. The use of a nested encryption ensures that the identity information is protected by at least two layers of security. For a malicious attack to be successful, both the private key and the UPK would need to be known. Since it is less likely a malicious attack could obtain both the private key, known only by the security broker 130 and security gateway 170, as well as the UPK that was generated using the already encrypted data that the malicious attack is attempting to access, the nested encryption improves the security of the data that will subsequently be transferred to the blockchain 150. Furthermore, the optional PIN may be used as a salt to generate the UPK and offers second authentication factor for security purposes.

The foregoing techniques also provide improved data delivery to client computers. Since programmed computers may provide IAM 120 services locally through an intranet without the need for constant internet connectivity, the use of internet bandwidth decreases when providing distribution services 160. Thus, the approaches herein improve networked data communication technology by reducing use of internet bandwidth.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
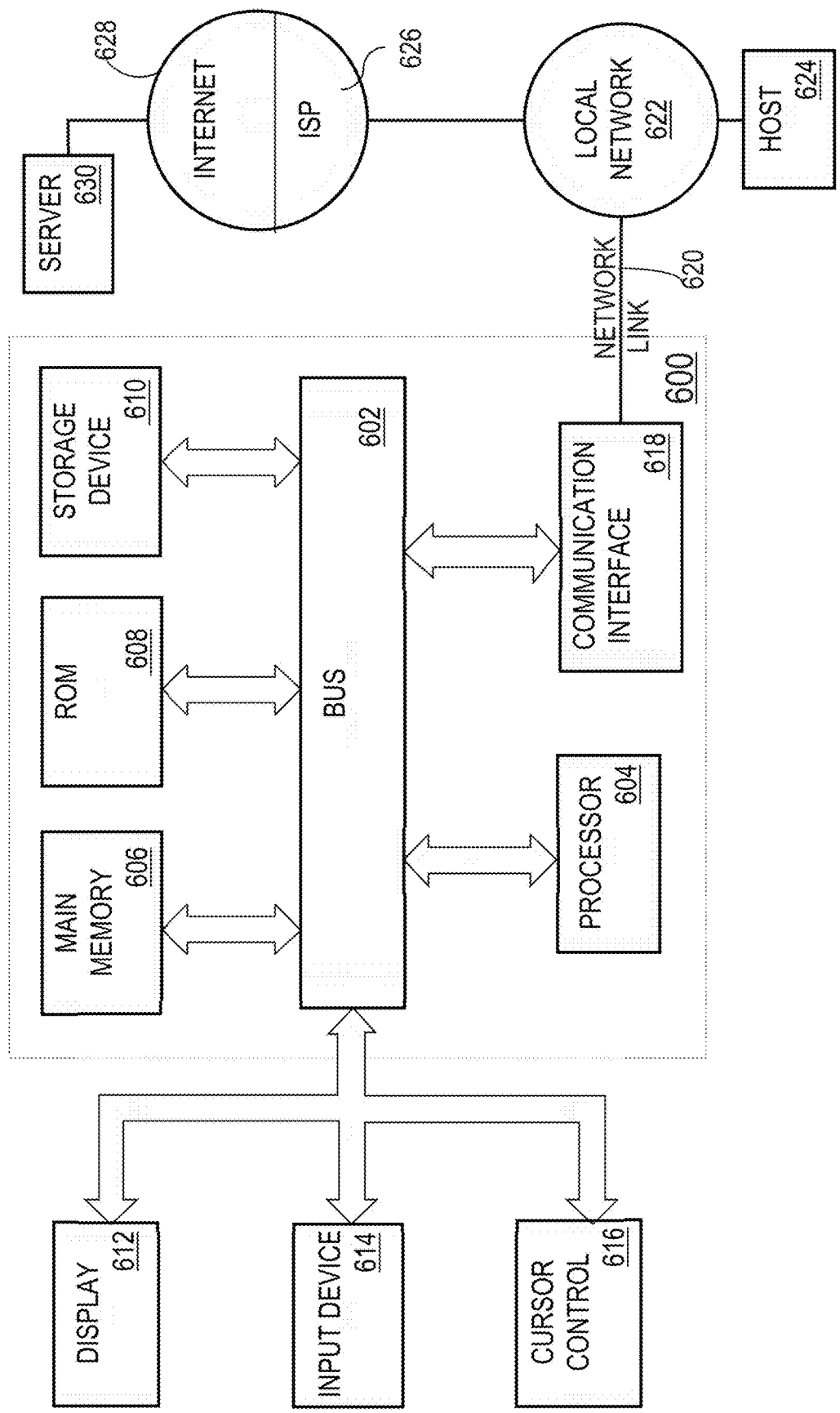
FIG. 6 illustrates a computer system upon which an embodiment of the invention may be implemented.

For example, FIG. 6 is a block diagram that illustrates a computer system upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    accessing, by a first server from a first data repository, identity information associated with one or more protected computing devices;
    creating, by the first server, mapped identity information by encrypting and mapping the identity information according to a different identity data format that is compatible with the one or more protected computing devices;
    updating, by the first server, stored blockchain data using the mapped identity information;

storing, by a second server, the mapped identity information from the blockchain data in a second data repository;

generating, by the second server, decrypted identity information from the mapped identity information stored in the second data repository; and performing, by the second server, one or more authentication services for a client device on behalf of the one or more protected computing devices by using the mapped identity information in the second data repository.

2. The method of claim 1, further comprising performing the one or more authentication services when centralized network connectivity is unavailable.

3. The method of claim 1, further comprising performing the one or more authentication services when centralized network connectivity is available.

4. The method of claim 1, further comprising performing the one or more authentication services when the client device is communicatively coupled with the second server.

5. The method of claim 1, further comprising:
parsing the identity information that is stored in the first data repository to generate a reorganized list of identity information; and
wherein mapping the identity information according to the different identity data format results in storing the mapped identity information in a third data repository.

6. The method of claim 1, further comprising:
in response to performing one or more authentication services, storing data from one or more authenticated computing devices in a third data repository; and
storing the data from the third data repository as part of the blockchain data.

7. The method of claim 1, further comprising mapping the identity information by applying a hash algorithm to the identity information.

8. The method of claim 1, further comprising:
detecting one or more changes to the identity information that is stored in the first data repository by evaluating a hash resulting from a previous detection of one or more changes to identity information; and
detecting mapped identity information updates to the blockchain data by evaluating a hash resulting from a previous detection of mapped identity information updates.

9. One or more non-transitory computer-readable storage media storing one or more sequences of program instructions which, when executed by one or more computing devices, cause performing:
accessing, by a first server from a first data repository, authentication information associated with one or more protected computing devices;
creating, by the first server, mapped authentication information by encrypting and mapping the authentication information according to a different authentication data format that is compatible with the one or more protected computing devices;
updating, by the first server, stored blockchain data using the mapped authentication information;
storing, by a second server, the mapped authentication information from the blockchain data in a second data repository associated with the second server;
generating, by the second server, decrypted authentication information from the mapped authentication information stored in the second data repository associated with the second server; and performing, by the second server, one or more authentication services for a client device on behalf of the one or more protected computing devices by using the mapped authentication information in the second data repository associated with the second server.

10. The one or more non-transitory computer-readable storage media of claim 9, wherein the one or more sequences of program instructions which, when executed by the one or more computing devices, further cause performing:
using the first server, parsing the authentication information that is stored in the first data repository to result in generating a reorganized list of authentication information; and
wherein mapping the authentication information according to the different authentication data format results in storing the mapped authentication information in a third data repository.

11. The one or more non-transitory computer-readable storage media of claim 9, wherein the one or more sequences of program instructions which, when executed by the one or more computing devices, further cause performing, in response to performing authentication services, storing data from authenticated devices in a fourth data repository.

12. The one or more non-transitory computer-readable storage media of claim 9, wherein the one or more sequences of program instructions which, when executed by the one or more computing devices, further cause performing:
detecting changes to authentication information stored in the first data repository, comprising evaluating an MD5 hash resulting from a previous detection of changes to authentication information; and
detecting mapped authentication information updates to the blockchain data, evaluating an MD5 hash resulting from a previous detection of mapped authentication information updates.

13. The one or more non-transitory computer-readable storage media of claim 9, wherein the one or more sequences of program instructions which, when executed by the one or more computing devices, further cause performing the one or more authentication services when centralized network connectivity is unavailable.

14. The one or more non-transitory computer-readable storage media of claim 9, wherein the one or more sequences of program instructions which, when executed by the one or more computing devices, further cause performing the one or more authentication services when centralized network connectivity is available.

15. The one or more non-transitory computer-readable storage media of claim 9, wherein the one or more sequences of program instructions which, when executed by the one or more computing devices, further cause performing the one or more authentication services when the client device is communicatively coupled with the second server.

16. A computer system comprising:
a distributed blockchain data repository;
a first server that is communicatively coupled to the distributed blockchain data repository and comprising a non-transitory data storage medium storing instructions which, when executed by the first server, cause performing:
accessing, from a first data repository, identity information associated with one or more protected computing devices;
creating mapped identity information by encrypting and mapping the identity information according to a different identity data format that is compatible with the one or more protected computing devices;

updating stored blockchain data in the distributed blockchain data repository using the mapped identity information;

a second server that is communicatively coupled to the distributed blockchain data repository and comprising a non-transitory data storage medium storing instructions which, when executed by the second server, cause performing:

storing the mapped identity information from the blockchain data in a second data repository associated with the second server;

generating decrypted identity information from the mapped identity information stored in the second data repository associated with the second server; and performing one or more authentication services for a client device on behalf of the one or more protected computing devices by using the mapped identity information in the second data repository associated with the second server.

17. The computer system of claim 16, wherein the second server is further configured to perform authentication services while centralized network connectivity is unavailable.

18. The computer system of claim 16, wherein the second server is further configured to perform authentication services while centralized network connectivity is available.

19. The computer system of claim 16, wherein the second server is further configured to:

store data from one or more authenticated computing devices in a third data repository; and calculate a hash of the data.

20. The computer system of claim 19, wherein the second server is further configured to record the hash to the distributed blockchain data repository.

* * * * *